(12) United States Patent
Deshpande et al.

(10) Patent No.: US 8,473,644 B2
(45) Date of Patent: Jun. 25, 2013

(54) ACCESS MANAGEMENT TECHNIQUE WITH OPERATION TRANSLATION CAPABILITY

(75) Inventors: Sanjay Deshpande, Austin, TX (US); Jaideep Dastidar, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 1004 days.

(21) Appl. No.: 12/398,103

(22) Filed: Mar. 4, 2009

(65) Prior Publication Data
US 2010/0228945 A1 Sep. 9, 2010

(51) Int. Cl.
*G06F 3/00* (2006.01)

(52) U.S. Cl.
USPC .................................. 710/20; 711/207

(58) Field of Classification Search
USPC .......................................................... 710/20
See application file for complete search history.

(56) References Cited

U.S. PATENT DOCUMENTS

| | | | |
|---|---|---|---|
| 4,890,223 A | 12/1989 | Cruess et al. | |
| 5,987,557 A | 11/1999 | Ebrahim | |
| 7,076,634 B2 | 7/2006 | Lambeth et al. | |
| 7,146,477 B1 | 12/2006 | Strongin et al. | |
| 7,490,191 B2 * | 2/2009 | Illikkal et al. | 711/6 |
| 2006/0069899 A1 | 3/2006 | Schoinas et al. | |
| 2006/0075146 A1 | 4/2006 | Schoinas et al. | |
| 2006/0075147 A1 * | 4/2006 | Schoinas et al. | 710/3 |
| 2006/0075285 A1 | 4/2006 | Madukkarumukumana et al. | |
| 2006/0288130 A1 | 12/2006 | Madukkarumukumana et al. | |
| 2007/0038839 A1 | 2/2007 | Hummel et al. | |
| 2007/0057957 A1 | 3/2007 | Wooten | |
| 2007/0168636 A1 * | 7/2007 | Hummel et al. | 711/202 |
| 2007/0168644 A1 | 7/2007 | Hummel et al. | |
| 2008/0098197 A1 * | 4/2008 | Craddock et al. | 711/206 |
| 2010/0228943 A1 | 9/2010 | Deshpande et al. | |

OTHER PUBLICATIONS

"PWRficient Partitions for Embedded and Server Systems", © 2005 P.A. Semi, Inc., pp. 1-9.
"Utilizing IOMMUs for Virtualization in Linux and Xen" —downloaded from http://developer.amd.com/Assets/IOMMU-ben-yehuda.pdf on Mar. 4, 2009, pp. 1-15.
Advanced Micro Devices, Inc. "AMD I/O Virtualization Technology (IOMMU) Specification", IOMMU Architectural Specification, PID 34434 Rev. 1.20—Feb. 2007, 79 pages.

* cited by examiner

*Primary Examiner* — Chun-Kuan Lee
*Assistant Examiner* — Brooke Taylor
(74) *Attorney, Agent, or Firm* — Haynes and Boone, LLP

(57) ABSTRACT

Access management techniques have been developed to specify and facilitate mappings between I/O and host domains in ways that provide flexibility in the form, granularity and/or extent of mappings, attributes and access controls coded relative to a particular I/O domain. In some embodiments of the present invention, operation translations coded relative to a particular logical I/O device, domain or sub-window seek to optimize functionality, isolation or some other figure of merit without regard to needs or limitations of another. In this way, operation translations need not be uniform and need not reduce supported operation semantics to correspond to that of a lowest common denominator I/O device. In some embodiments, the form of mappings (e.g., of operation translations) may be specialized on a per-logical-device basis (or even a per-sub-window basis), thereby offering individual logical I/O devices (or sub-windows thereof) immediate, indexed, and/or untranslated operation mapping frameworks appropriate to their individual requirements or needs. In general, flexibilities and efficiencies afforded in some embodiments of the present invention can be desirable, particularly as the diversity of I/O device types and richness of transaction semantics supported in interconnect fabrics increase. Some embodiments may be leveraged in support of sophisticated system partitions or I/O virtualizations.

18 Claims, 8 Drawing Sheets

| Index Offset (hex) | bits 0:31 | bits 32:39 | bits 40:47 | bits 48:51 | bits 52:55 | bits 56:57 | bit 58 | bit 59 | bit 60 | bit 61 | bit 62 | bit 63 |
|---|---|---|---|---|---|---|---|---|---|---|---|---|
| 00 | | WBA | WBA | WBA | WBA | WSE | MW | AP | AP | DD | PT | V |
| 08 | DA | IA | IA | IA | WCE | WCE | WCE | ATM | ATM | ATM | OTM | OTM |
| 10 | FSPI | IOEB | IOEB | IOEB | SWSE | SWSE | | | | | | |
| 18 | FSPI | IOEA | MOEA | reserved | reserved | reserved | reserved | reserved | reserved | reserved | reserved | reserved |
| 20 | | SBA | SBA | SBA | SBA | SSE | OMI | OMI | OMI | OMI | OMI | OMI |
| 28 | | TCTBA | TCTBA | TCTBA | TCTBA | PSE | TCEF | MOEB | MOEB | MOEB | MOEB | MOEB |
| 30 | | reserved | reserved | reserved | reserved | reserved | reserved | reserved | reserved | reserved | reserved | reserved |
| 38 | | reserved | reserved | reserved | reserved | reserved | reserved | reserved | reserved | reserved | reserved | reserved |

| Index Offset (hex) | bits 0:31 | bits 32:39 | bits 40:47 | bits 48:51 | bits 52:55 | bits 56:57 | bit 58 | bit 59 | bit 60 | bit 61 | bit 62 | bit 63 |
|---|---|---|---|---|---|---|---|---|---|---|---|---|
| 00 | reserved | LIODN | | | reserved | | | | AP | DD | PT | V |
| 08 | DA | | | IA | | | reserved | | ATM | | OTM | |
| 10 | TWBA | | | | | SWSE | | | reserved | | | |
| 18 | reserved | IOEA | MOEA | IOEB | | | | MOEB | | | | |
| 20 | SBA | | | | | SSE | | OMI | | | | |
| 28 | TCTBA | | | | PSE | | TCEF | | reserved | | | |
| 30 | reserved | | | | | | | | | | | |
| 38 | | | | | | | | | | | | |

FIG. 6

ACCESS MANAGEMENT TECHNIQUE WITH OPERATION TRANSLATION CAPABILITY

CROSS-REFERENCE TO RELATED APPLICATION(S)

The present application is related to commonly owned U.S. application Ser. No., 12/398,099, filed on even date herewith, entitled "Access Management Technique for Storage-Efficient Mapping between Identifier Domains" and naming Deshpande and Dastidar as inventors.

BACKGROUND

1. Field

This disclosure relates generally to data processing systems, and more specifically, to peripheral or input/output (I/O) management techniques whereby operations are mapped from one domain to another.

2. Related Art

In a computational system that includes computing resources (e.g., processor cores), storage resources and input/output (I/O) resources, mechanisms are often needed to manage transactions, operations or accesses that cross from one domain to another (such as between an I/O domain and a memory coherence domain). Often these mechanisms are used to map addresses or other identifiers while maintaining isolation between different transacting entities, e.g., logical or physical I/O devices, execution processes and/or virtual machines or partitions.

For example, isolation of memory address spaces (e.g., in a multiprocessor or in a virtualization system that exposes multiple virtual processors) is typically achieved using a memory management unit (MMU) that maps virtual memory addresses to physical memory using page table entries that limit the visibility of the processor to the partition's own resources. Mapping and isolation mechanisms can also be employed with respect to I/O transactions (or accesses) in devices or functional blocks commonly known as IOMMUs or peripheral access management units (PAMUs).

In some access management unit implementations, whether styled or deployed as an MMU, IOMMU or PAMU, it can be desirable to map operations as well as addresses or other identifiers. For example, because the accesses specified for an I/O domain typically differ from those in a memory coherence domain, operation specifiers may be translated at a domain boundary. As conventionally implemented, such operation translations are static and applied uniformly to all accesses, irrespective of the specific I/O device involved.

Unfortunately, the increasing diversity of I/O devices and increasingly complex transaction semantics supported in some modern interconnect fabrics tend to create formidable access management challenges. In some cases, implementations that employ static uniformly applied operation translations can remain tethered to a lowest common denominator of operation semantics. For these and other reasons, greater flexibility and improved techniques are desired.

BRIEF DESCRIPTION OF THE DRAWINGS

The present invention may be better understood, and its numerous objects, features, and advantages made apparent to those skilled in the art by referencing the accompanying drawings.

FIGS. 5 and 6 show illustrative organizations of peripheral access authorization and control entries (PAACEs) that may be employed, in accordance with some embodiments of the present invention, in first- and second-level peripheral access authorization and control tables (PAACTs), respectively.

The use of the same reference symbols in different drawings indicates similar or identical items.

DESCRIPTION OF THE PREFERRED EMBODIMENT(S)

Figure 1:
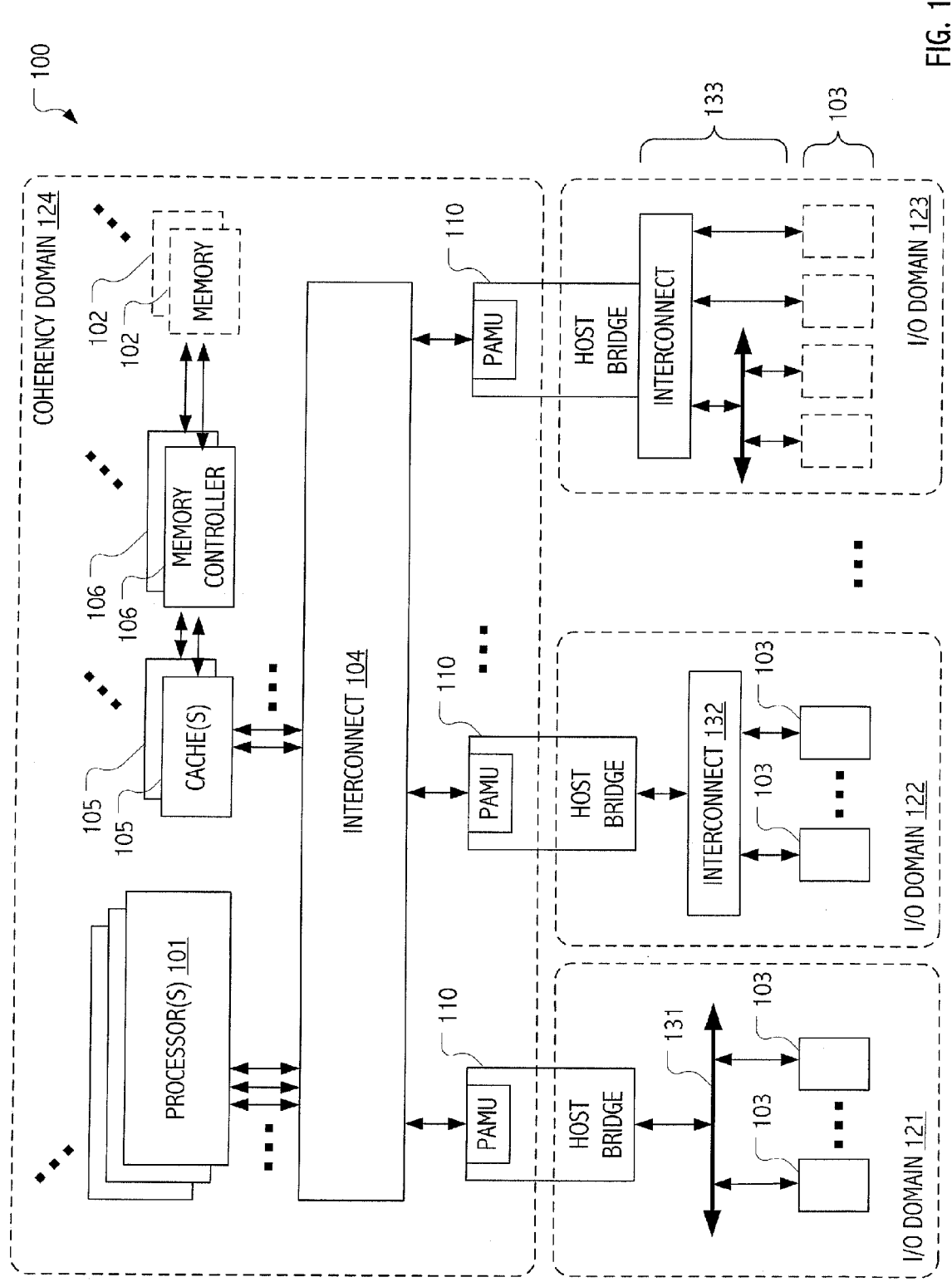
FIG. 1 is a block diagram of a computational system in which operations are mapped between an input/output (I/O) interconnect domain and a coherency domain using a peripheral access management unit (PAMU) in accordance with some embodiments of the present invention.

Access management techniques have been developed to specify and facilitate mappings between I/O and host domains in ways that provide flexibility in the form, granularity and/or extent of mappings, attributes and access controls coded relative to a particular I/O domain. In some embodiments, different identifier and/or operation translation models may be employed on a per-device, per-logical-device or even a per-sub-window basis. In general, flexibilities and efficiencies afforded in some embodiments of the present invention can be desirable, particularly as the diversity of I/O device types and richness of transaction semantics supported in interconnect fabrics increase. Some embodiments may be leveraged in support of sophisticated system partitions or I/O virtualizations.

In some embodiments, rather than attempting to create a unified set of access, authorization and/or control information for mappings between all I/O and host domains (or even a unified mapping for subsets of the I/O domains corresponding to logical I/O devices supported using common underlying resources), each logical I/O device is supported with information that need only encode that pertinent thereto and then, only in a manner that is useful or efficient for the particular logical I/O device and its relevant mappings. In particular, some embodiments of the present invention, operation translations coded relative to a particular logical I/O device, domain or sub-window seek to optimize functionality, isolation or some other figure of merit without regard to needs or limitations of another. In short, operation translations need not be uniform and need not reduce supported operation semantics to correspond to that of a lowest common denominator I/O device. Some embodiments, the form of mappings (e.g., of operation translations) may be specialized on a per-logical-device basis (or even a per-sub-window basis), thereby offering individual logical I/O devices (or sub-windows thereof) immediate, indexed, and/or untranslated operation mapping frameworks appropriate to their individual requirements or needs. Of course, in accord with the flexibility provided, mappings for disparate I/O domains, devices or subwidows may optionally be encoded in like manner (e.g., with similar or identical form, granularity, extent and/or translation models), but need not be synthesized into a unified mapping.

For concreteness of description, we focus on certain illustrative implementations of a peripheral access management unit (PAMU) in a logically partitionable, multiprocessor-based computational system for which a multiplicity of logical I/O devices and domains are supported using underlying physical resources. Typically, operating system images are instantiated in individual partitions and one or more PAMU instances mediate address and operation mappings between I/O domains and a coherency domain of the system. In general, the illustrative implementations include support for a range of variations in form, granularity and/or extent of mappings as well as support for access authorization controls and other features that need not be included in all embodiments. Accordingly, based on the description herein, persons of ordinary skill in the art will appreciate applications of the invented techniques to other access management systems (including those styled as MMUs, PAMUs, IOMMUs, etc.) and to computational systems without virtualization, multiprocessors support or partitionable aspects.

For generality, the illustrated implementations are described in a manner that is generally agnostic to design details such as instruction set architecture, I/O device types, operating system conventions, memory model, interconnect technology, communication or data transfer protocols and access/authentication mechanisms employed. Where useful to provide concreteness of description, certain illustrative designs are described, though generally without limitation. Techniques described herein have broad applicability to other access management and operation mapping systems, but will be understood and appreciated by persons of ordinary skill in the art in the illustrated context. Accordingly, in view of the foregoing and without limitation on the range of access management techniques, underlying processor or system architectures, and mapping domains that may be employed in embodiments of the present invention, we describe certain illustrative embodiments.

System and Integrated Circuit Realizations, Generally

FIG. 1 illustrates a computational system 100 in which addresses or other identifiers are mapped between various input/output (I/O) interconnect domains (e.g., I/O domains 121, 122 and 123) and a coherency domain 124 using respective peripheral access management units (PAMUs) in accordance with some embodiments of the present invention. Computational system 100 includes processors 101, memory 102 and I/O devices 103 coupled by an interconnect 104. Although any of a variety of memory hierarchies may be employed, FIG. 1 illustrates a configuration in which at least some level of cache 105 is interposed between interconnect 104 and memory 102 (and associated memory controllers 106). In some embodiments, caches 105 are configured as L3 cache and represent state that spans the data and instruction spaces of processors 101, while additional levels of L1 and L2 cache (not separately shown) are collocated with individual processors or processor cores.

In the illustrated configuration, interconnect 104 includes a scalable on-chip network that is suitable for interconnecting multiple processor cores with memory and I/O subsystems. Processors 101 are linked to each other, to memory 102 and host bridges 110 via the interconnect 104 and, in some embodiments, interconnect 104 implements a modern front-side multi-path interconnect fabric that supports concurrent non-conflicting transactions and high data rates. However, in other embodiments, a conventional front-side bus may be employed as interconnect 104.

In the illustrated configuration, I/O devices 103 do not connect directly to primary processor busses, but rather via respective host bridges 110. In general, any given I/O device 103 attaches to an I/O interconnect, such as PCI Express, AXI or other interconnect technology, and has a set of resources appropriate to its function. For generality, bus-type interconnects 131, multiplexed interconnects 132 and mixed-type interconnect configurations 133 are all illustrated. Operations that involve an I/O device 103 may include:

I/O operations: storage operations initiated from within coherency domain 124 which cross the coherency domain boundary, direct memory access (DMA) operations: storage operations initiated from outside coherency domain 124 that target storage (e.g., memory 102) within the coherency domain, and direct peer access (DPA) operations: storage operations initiated outside coherency domain 124 that target storage that is also outside the coherency domain.

Thus, a wide variety of I/O devices is contemplated, including devices that support DMA and/or DPA operations.

For purposes of illustration, and without limitations as to operation types and variants supported, I/O device 103 is representative of a collection of devices that initiate read/write-type operations and that are themselves targets of read/write-type operations initiated by processors (e.g., processors 101) and/or other I/O devices. In some cases, read- and/or write-type operations supported by I/O devices include implementation- or device-specific variants that contemplate synchronization, coherence or other enhancements to basic read/write operation semantics. Likewise, sources and targets of operations in a coherency domain tend to support read/write-type operations with reasonably complex semantic variations. For example, in configurations such as illustrated in FIG. 1, the set of operation types supported by processors 101, memories 102 and other sources and targets of operations in coherency domain 124 will tend to include semantic variations consistent with coherence, ordering, synchronization and other protocols enforced within the domain.

In some embodiments, a substantial portion of a computational system such as illustrated in FIG. 1 is implemented as a system on a chip (SoC) and embodied as a single integrated circuit chip. In such configurations, memory and/or a subset of I/O devices or interfaces may be implemented on- or off-chip, while the substantial entirety of illustrated blocks are packaged as an SoC. However, in other embodiments and more generally, portions of computational system 100 may be implemented in or as separate integrated circuits in accord with design, packaging or other requirements.

In some embodiments, computational system 100 is configured as a partitionable multiprocessor system in which storage operations involving I/O devices may be confined to a particular partition (or partitions) to which they correspond. In such embodiments, isolation of partitions may be achieved using device authorization mechanisms and address and operation type checking may be performed using respective peripheral access management units (PAMUs). Although not essential to all embodiments, flexible, even dynamic, partitioning of underlying hardware may be facilitated using modern virtualization technologies (e.g., hypervisors) that execute on underlying resources of computational system 100 (e.g., processors 101, memory 102 and I/O devices 103)

and expose fractional portions thereof to guest computations (e.g., operating system instances and applications) as virtual machines or partitions. Virtualization technologies are widely employed in modern computational systems and, particularly with regard to processor and memory virtualization, suitable designs and the operation thereof are well understood by persons of ordinary skill in the art. In some embodiments, a firmware-based hypervisor is employed.

Focusing illustratively on I/O virtualization, it is worth noting that underlying physical I/O devices 103 are typically virtualized as a multiplicity of logical I/O devices (LIODs) presented to software executing on computational system 100 (or on virtual machines thereof). In this way, each logical I/O device has its own programming/operation interface and view of the system storage space. In general, this view extends only to those limited portions of large system and peripheral memory spaces (within coherency domain 124) and I/O address/identifier spaces (within the I/O domains 121, 122 . . . 123) that are pertinent to operation of the particular logical I/O device and current partition state of computational system 100. In general, a given I/O device 103 may present as multiple logical I/O devices and, conversely, multiple I/O devices 103 may present as a logical I/O device.

In the illustration of FIG. 1, coherency domain 124 spans the collection of memory subsystems including memory 102 and caches (e.g., the illustrated L2/L3 caches 105 and any other caches or lookaside stores), processors 101, interconnect 104, and I/O host bridges 110 that cooperate through relevant protocols to meet memory coherence, consistency, ordering, and caching rules specific to a platform architecture. For example, in some embodiments, coherency domain 124 conforms to coherence, consistency and caching rules specified by Power Architecture™ technology standards as well as transaction ordering rules and access protocols employed in a CoreNet™ interconnect fabric. Power Architecture is a trademark of Power.org and refers generally to technologies related to an instruction set architecture originated by IBM, Motorola (now Freescale Semiconductor) and Apple Computer. CoreNet is a trademark of Freescale Semiconductor, Inc.

Memory addresses can be used to identify storage locations within (or from the perspective of) coherency domain 124. Typically, a system memory portion of this coherency domain address space is used to address locations in memory 102, while a peripheral memory portion of the coherency domain address space is used for addresses that processors 101 view as assigned to I/O host bridges 110. Using facilities of respective peripheral access management units (PAMUs), the I/O host bridges translate between coherency domain addresses and addresses (or identifiers) for particular I/O devices within corresponding ones of the I/O domains (e.g., I/O domain 121, 122 or 123). As the number and diversity of I/O devices scales, complexity of mapping and related access and authorization controls can increase dramatically. Furthermore, since a multiplicity of logical I/O devices may be virtualized in accord with system partitioning, scaling challenges can further strain conventional mapping techniques. Techniques now described with reference to peripheral access management unit (PAMU) facilities of the I/O host bridges 110 seek to address these or other challenges.

Peripheral Access Management Unit (PAMU)

Figure 2:
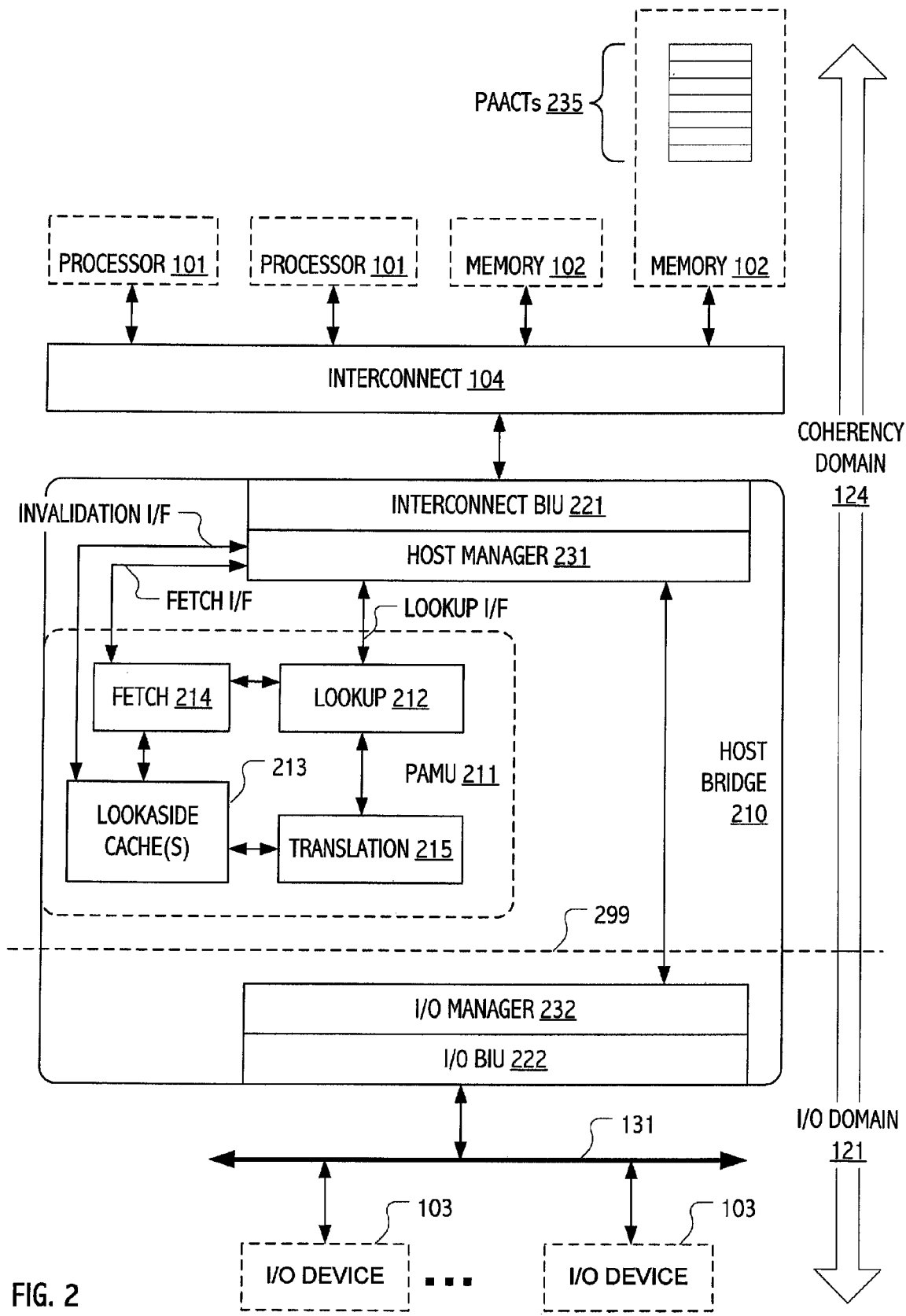
FIG. 2 depicts a peripheral access management unit (PAMU) of a host bridge suitable for positioning astride the boundary between an I/O domain and a coherency domain.

FIG. 2 depicts a peripheral access management unit (PAMU) of host bridge 210 positioned astride a boundary 299 between an I/O domain and a coherency domain. In the illustrated configuration, PAMU 211 maps between identifiers used by I/O devices 103 within I/O domain 121 and identifiers used within coherency domain 124. Typically, identifiers in I/O domain 121 are styled as device or I/O addresses and identifiers in coherency domain 124 include physical addresses in memory 102.

In general, host bridge 210 couples to interconnect technologies employed in respective domains that it bridges and in accord with any operative interface protocols and conventions. In the illustrated configuration, respective bus interface units (e.g., interconnect BIU 221 and I/O BIU 222) implement the appropriate transaction protocols. In the case of interconnect 104 and BIU 221, a split transaction model is supported with independent address, response and data paths, together with a transaction ordering and coherence framework. In general, read and write operations are implemented as a series of interconnect transactions and host bridge 210 acts as both a requester and target for transactions (and operations) transacted via interconnect 104. In the illustrated configuration, full real address width address transactions (e.g., 64-bit in some embodiments) are supported. In the case of I/O bus 131 and BIU 222, any of a variety of interconnect technologies and transaction models, (including PCI Express, AXI, etc.) may be supported. Design and operation of suitable bus interface units are well understood in the art. BIUs 221 and 222 are of any suitable designs.

Host manager 231 and I/O manager 232 receive operations such as read and write operations from traffic transacted by respective BIUs and interact with each other to effectuate, in a respective one of coherency domain 124 and I/O Domain 121, operations initiated in the other. For example, host manager 231 may receive a write-type operation from coherency domain 124, recognize the operation as destined for an I/O device within I/O Domain 121 and supply a corresponding mapped operation to I/O manager 232 for transacting via I/O bus 131 and completion on an appropriate I/O device 103 instance. Similarly, I/O manager 232 may receive a read-type operation from an I/O device 103 of I/O Domain 121, recognize the operation as destined for memory 102 in coherency domain 124 and supply same to host manager 231 for transaction via interconnect 104. Return path read data may then flow back (through interconnect 104, BIU 221, host manager 231, I/O manager 232, BIU 222 and I/O bus 131) to the requesting I/O device 103 instance.

In the illustrated configuration, coherence transactions or operations such as CPU initiated barrier transactions and snoop transactions for invalidation of mapping entries are also supported. More generally, a wide variety of suitable variations on techniques for bridging domains will be understood by persons of ordinary skill in the art. Accordingly, the foregoing examples are for illustrative purposes only and, based on the description herein, persons of ordinary skill in the art will appreciate numerous variations on operation-type, flow, sense and sequencing appropriate to a given implementation, I/O device suite, interconnect technology, coherence model and/or instruction set architecture.

Turning now to PAMU 211, operations that bridge the boundary 299 between coherency domain 124 and I/O Domain 121 can, and typically do, require some sort of mapping between identifier domains. In addition, in some embodiments, authorization checks, operation translations, and other controls or transformations may be performed incident to the mapping. In the illustration of FIG. 2, PAMU 211 performs mappings (and any operative controls or transformations) based on lookups against peripheral access authorization and control tables (PAACTs 235), which are initiated by host manager 231 in the course of bridging operations (in either direction) between coherency domain 124 and I/O Domain 121. In general, entries of such tables are represented (at least in primary form) in memory 102 of coherency domain 124 and are at least partially cached in storage local to PAMU 211.

In general, by deploying PAMU 211 (here, integrated with host bridge 210), a computational system obviates the need for I/O devices 103 to directly address physical memory and allows large (in the aggregate) discontiguous regions of physical memory to be employed in I/O transfers, while I/O devices can be presented with respective virtual address spaces that may be compact and contiguous. Indeed, PAMU 211 allows virtual (I/O domain) to physical (coherency domain) mappings to be presented on a per I/O device, or per logical I/O device, basis. Note that in partitioned or virtualization based systems, a guest operating system will not typically have access to underlying virtual-to-physical memory address mappings. Accordingly, it may be quite difficult for the guest operating system to manage direct memory access (DMA). PAMU 211 facilitates use of partitioning and/or virtualization techniques by providing a mapping mechanism configurable using in-memory tables. In this way, a hypervisor or virtualization system maintains virtual-to-physical mappings between I/O and coherency domain identifiers (much in the same way it may maintain shadow page tables for mappings between guest virtual addresses and underlying physical memory addresses) and delegates the mapping function for individual accesses or operations to PAMU 211.

In the illustration of FIG. 2, virtual-to-physical mappings between I/O and coherency domain identifiers are represented in peripheral access authorization and control tables (PAACTs 235) which reside in memory 102. As the total number of I/O devices and/or logical I/O devices grows, the number of entries not pertinent to any particular physical or logical I/O device can likewise scale. Accordingly, to reduce latencies, PAMU 211 coherently caches contents of peripheral access authorization and control entries (PAACEs) that encode identifier mappings and related controls or transformations for I/O operations, direct memory access (DMA) operations, and/or direct peer access (DPA) operations that involve I/O Domain 121. Accordingly, for a given access (e.g., a read- or write-type access initiated from I/O Domain 121), host manager 231 seeks to obtain (for a particular logical I/O device) the appropriate mapping between an I/O Domain 121 side identifier and a coherency domain 124 side memory address.

Host manager 231 enlists PAMU 211 in that lookup, e.g., using a logical I/O device number (LIODN) and I/O domain address to identify relevant entries in peripheral access authorization and control tables. Lookup unit 212 traverses peripheral access authorization and control tables and returns relevant mapping information (and optionally, operation translation information) for use in initiating appropriate transactions in interconnect 104 to access mapped locations in memory 102. If the relevant traversal can be performed and if relevant access authorization and control entries can be retrieved from lookaside cache 213, then lookup unit 212 may efficiently satisfy PAMU 211 without walking peripheral access authorization and control tables in memory 102 (e.g., PAACTs 235). If not, fetch unit 214 coordinates retrieval of relevant peripheral access authorization and control entries (PAACEs) from memory 102 to satisfy the lookup. PAMU 211 also provides an invalidation interface to allow cached PAACEs to be invalidated in accord with a suitable PAACTs coherence protocol. In the illustration of FIG. 2, translation unit 215 performs address translations to effectuate mappings between I/O Domain 121 side identifiers and a coherency domain 124 side memory addresses.

Operation Translations, Generally

Translation unit 215 also supports translation of source operation types to destination operation types in accord with contents of relevant PAACEs. As with identifier/address mappings, operation translations are based on information coded in memory resident tables that may be cached in cache 213. In some embodiments in accordance with the present invention, operation translations performed by PAMU 211 are between abstract types represented as ingress operation encodings (IOEs) and egress operation encodings (EOEs).

Figure 3:
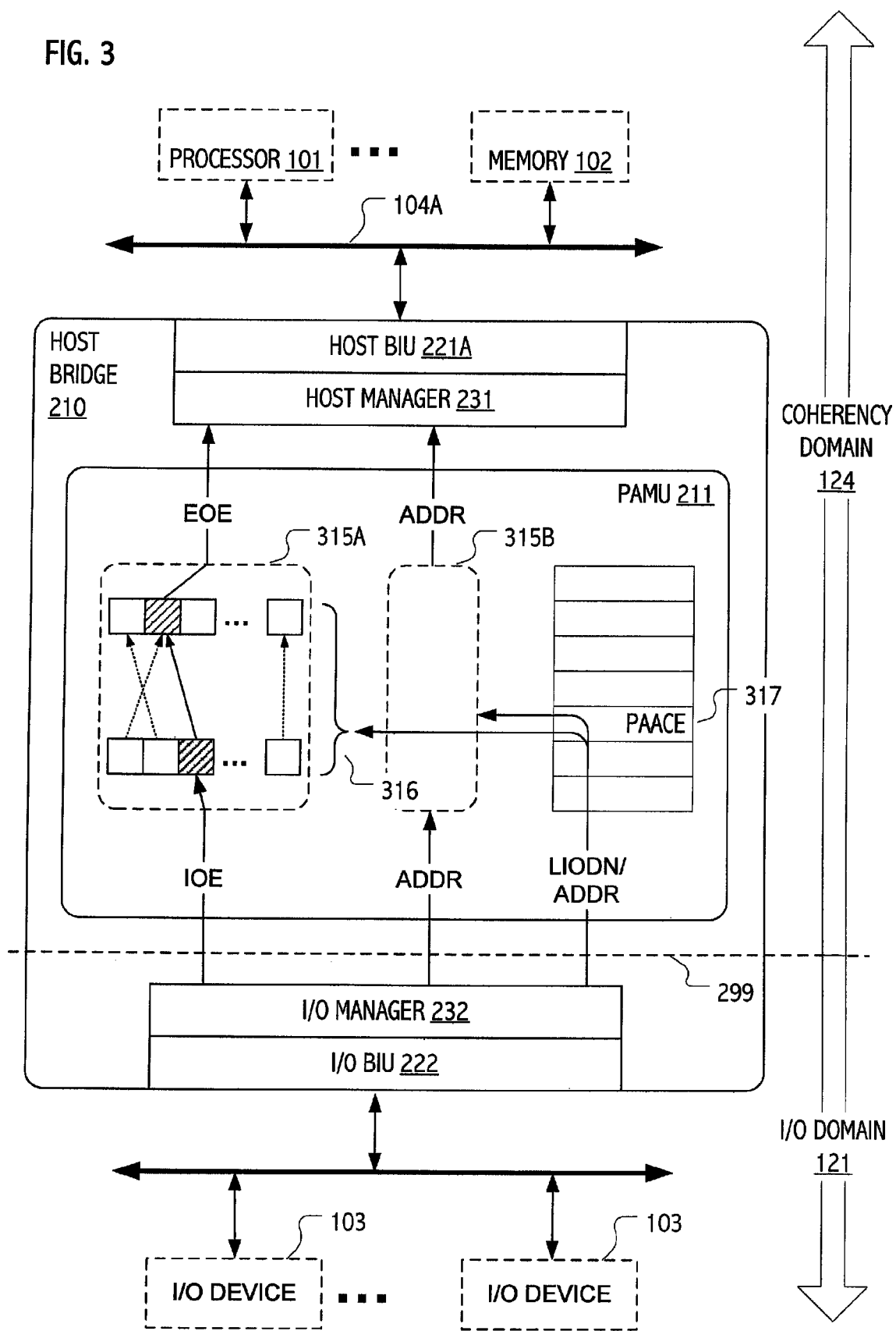
FIG. 3 depicts an illustrative operation translation scenario in a peripheral access management unit (PAMU) in accordance with some embodiments of the present invention.

Referring generally to FIG. 3, an IOE may be (or may correspond to) the actual transaction code of an operation in accord with a source interconnect protocol, e.g., a read-type operation encoding received at BIU 222 from a particular I/O device 103 in I/O Domain 121. Similarly, an EOE may be (or may correspond to) the actual transaction code of an operation in accord with a destination interconnect protocol, e.g., an appropriate read-with-no-intention-to-cache-type operation encoding supplied into coherency domain 124 (via host BIU 221A) for an access to be performed in memory 102. Thus, an operation translation facility 315A of PAMU 211 maps (316) ingress encodings to egress encodings based on mapping information coded in or associated with an operative table entry (e.g., PAACE 317). As with address translations 315B, operative table entries are selected using logical I/O device numbers (LIODNs). As described elsewhere herein, in some embodiments that support sub-windowing, address information may also be used in the selection of an operative table entry for operation (and address) translation information.

By representing operations as abstract encodings (i.e., as IOE and EOE values), some embodiments of the present invention allow translations and operation type checks to be delegated to PAMU 211, and flexibly specified by supervisory code such as hypervisor, without intimate knowledge source and destination interconnect protocols and operations. Particular sets of IOE and EOE values are, in general, implementation-, interface- and even window-specific. In some embodiments, a set of IOE values used in operation translations may be selected to include operation type codings that correspond to an I/O domain oriented set of variants on read- and write-type operation semantics such as:

Read
Write
Enhanced Read (type 0)
Enhanced Write (type 0)
Enhanced Read (type 1)
Enhanced Write (type 1)
Read with Atomic Clear
Read with Atomic Set
Read with Atomic Decrement
Read with Atomic Increment Similarly, in some embodiments, a set of EOE values used in operation translations may be selected to include operation type codings that correspond to a memory coherence domain oriented set of variants on read- and write-type operation semantics such as:

Read
Write
Read with Atomic Clear
Read with Atomic Set
Read with Atomic Decrement
Read with Atomic Increment
Load External Cache
Load External Cache with Stash Lock
Load External Cache with Preferred Exclusive
Load External Cache with Preferred Exclusive & Lock Load External Cache with Forced Exclusive
Load External Cache with Forced Exclusive & Lock
Read with Stash Allocate
Read with Stash Allocate & Unlock
Read with Invalidate
Read with No Intention to Cache
Write Cache Inhibited
Write with Stash Allocate
Write with Stash Allocate & Lock
Write with Stash Allocate & Lock or Write Target Whatever the operative sets of IOE and EOE values supported, persons of ordinary skill in the art will appreciate that by allowing PAMU 211 to perform operation translations (315A) based on information coded in (or accessible) using the peripheral access authorization control facilities (e.g., PAACTs, PAACEs and related codings described herein), mappings may be specialized on an I/O device, logical I/O device or even sub-window basis. In this way, mappings between particular coherence domain operation semantics chosen to effectuate operations initiated in an I/O domain (and vice versa) may be defined and even dynamically varied under control of supervisory code such as a hypervisor.

Typically, coherence domain operation semantics can be expected to provide a richer set of variations (in accord with coherence- and sychronization-oriented protocols) than I/O domain operation semantics (generally) and particular I/O device operation sets (specifically). Accordingly, embodiments in accordance with the present invention provide a flexible and scalable mechanism by with appropriate cross-domain operation translations may be specified.

In general, implementation-specific mappings between actual codes employed (on the one hand) in an interconnect domain and IOE and EOE encodings employed (on the other hand) at PAMU 211 may be made at an interface facing the pertinent source or destination domain. For example, in accord with the preceding example and consistent with FIG. 3, an I/O Domain 121 facing block of host bridge 210 (e.g., I/O manager 232) may employ implementation-specific logic or even an implementation specific ingress decode table to map from interconnect protocol operation codes particular to I/O Domain 121 to IOEs supported by PAMU 211. Correspondingly, and again in accord with the preceding example and FIG. 3, a coherency domain 124 facing block of host bridge 210 (e.g., host manager 231) may employ implementation-specific logic or an implementation specific egress decode table to map from EOEs supported by PAMU 211 to interconnect protocol operation codes particular to coherency domain 124.

These and other operation translation techniques will be understood with reference to examples of peripheral access authorization control tables (PAACTs) and entries (PAACEs) now described. In some embodiments in accordance with the present invention, multiple PAACE based techniques are supported by PAMU 211 to facilitate translating between IOEs and EOEs.

Peripheral Access Authorization and Control Tables (PAACTs)

Operation of PAMU 211 (including both address and operation translations performed thereby) will be understood with reference to the structure and coding of peripheral access authorization and control tables (PAACTs) and peripheral access authorization and control entries (PAACEs) thereof. PAACTs are memory-resident data structures initialized and maintained by supervisory code (e.g., by a hypervisor in a computational system that employs partitioning or virtualization) and used by PAMU 211.

A PAACT is a table of PAACEs, which each encode access rights afforded a logical I/O device. A logical I/O device number (LIODN), which is typically signaled with a logical I/O device access, is used to identify a corresponding PAACE from the PAACT. Direct storage access operations (DSA operations, including memory access and direct peer access operations) performed by logical I/O devices are typically associated with a computational system partition and are allocated a portion (or DSA window) of I/O interconnect address space. The DSA window, in turn, corresponds to one or more regions of storage (e.g., memory 102) in the coherency domain. A PAACE identifies and codes the extent of the DSA window that is allocated and accessible to the corresponding logical I/O device. Typically, only accesses within the corresponding DSA window are authorized for the logical I/O device. Also, a logical I/O device may be subject to restrictions as to the type of DSA operations it is allowed to perform. In general, attributes that define access restrictions/permissions for a particular logical I/O device are coded in (or retrieved via) a corresponding PAACE. For example, in some embodiments or situtations, certain ingress operations may be marked as invalid or may be translated to egress operations with more restricted semantics.

In some embodiments, a logical I/O device may be allowed to access multiple windows. Accordingly, for at least some logical I/O devices, this multiplicity of windows (and their corresponding access authorization controls, address/identifier mappings and operation translations) may be coded in a two-level hierarchy, whereby a DSA window spans multiple sub-windows (e.g., $2^n$ equal sized sub-windows) defined within the DSA window. The first sub-window is referred to as the primary sub-window and the remaining ones are secondary sub-windows. The DSA window defines the overall address range within which the one or more sub-windows reside.

Building on the foregoing, in some embodiments in accordance with the present invention, information for the DSA window corresponding to a particular logical I/O device is encoded in a primary PAACE of a first-level PAACT. Accordingly, for some logical I/O devices, one or more secondary PAACEs from a second-level PAACT encode additional information relative to constituent secondary sub-windows. For the primary (or in some cases, sole) sub-window, access authorization controls, address/identifier mappings and operation translations are coded in the primary PAACE, whereas for secondary sub-windows (if any), access authorization controls, address/identifier mappings and operation translations are coded in respective secondary PAACEs.

Figure 4:
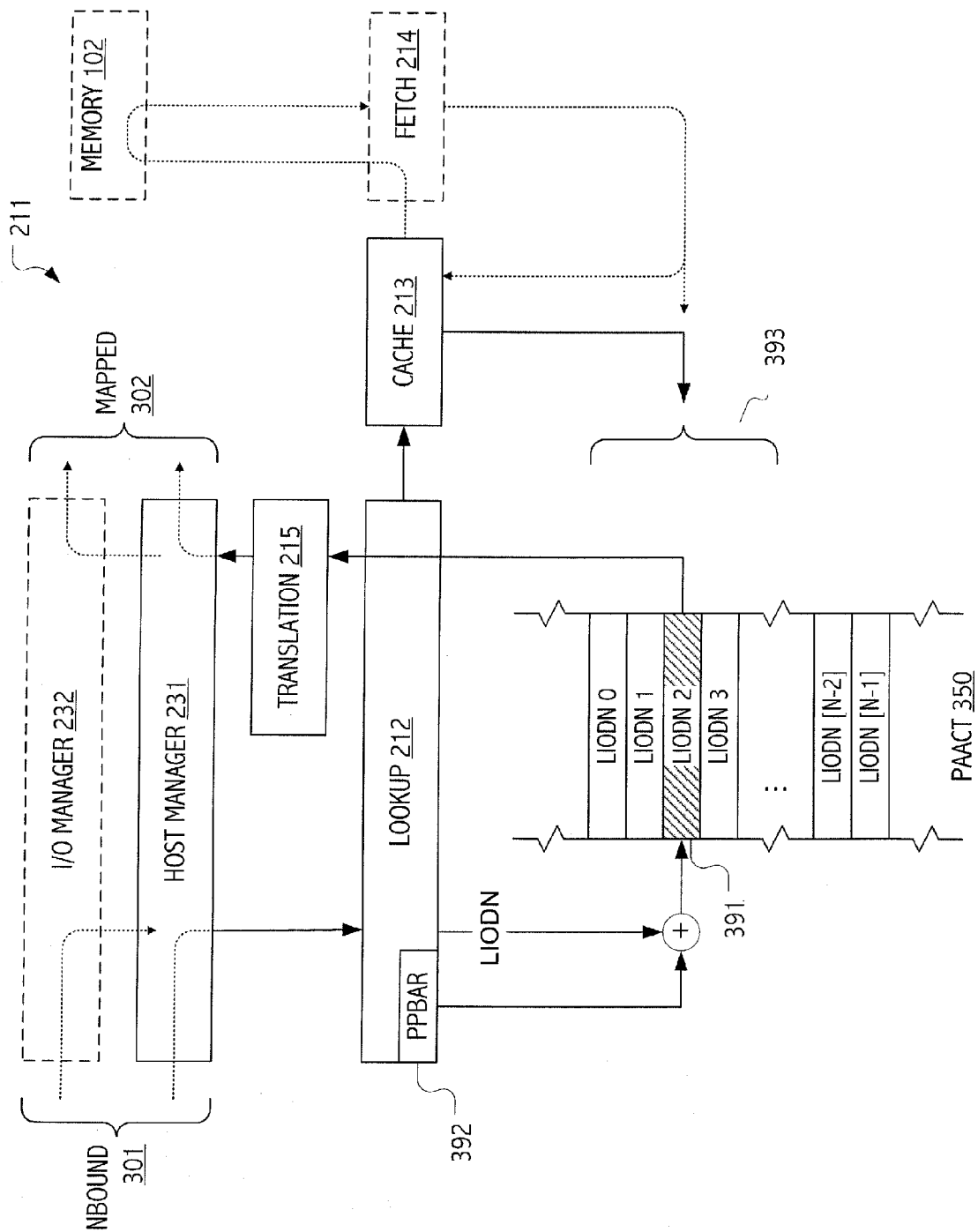
FIG. 4 depicts use of a first-level peripheral access authorization and control table (PAACT) by a peripheral access management unit (PAMU) in accordance with some embodiments of the present invention.
Figure 7:
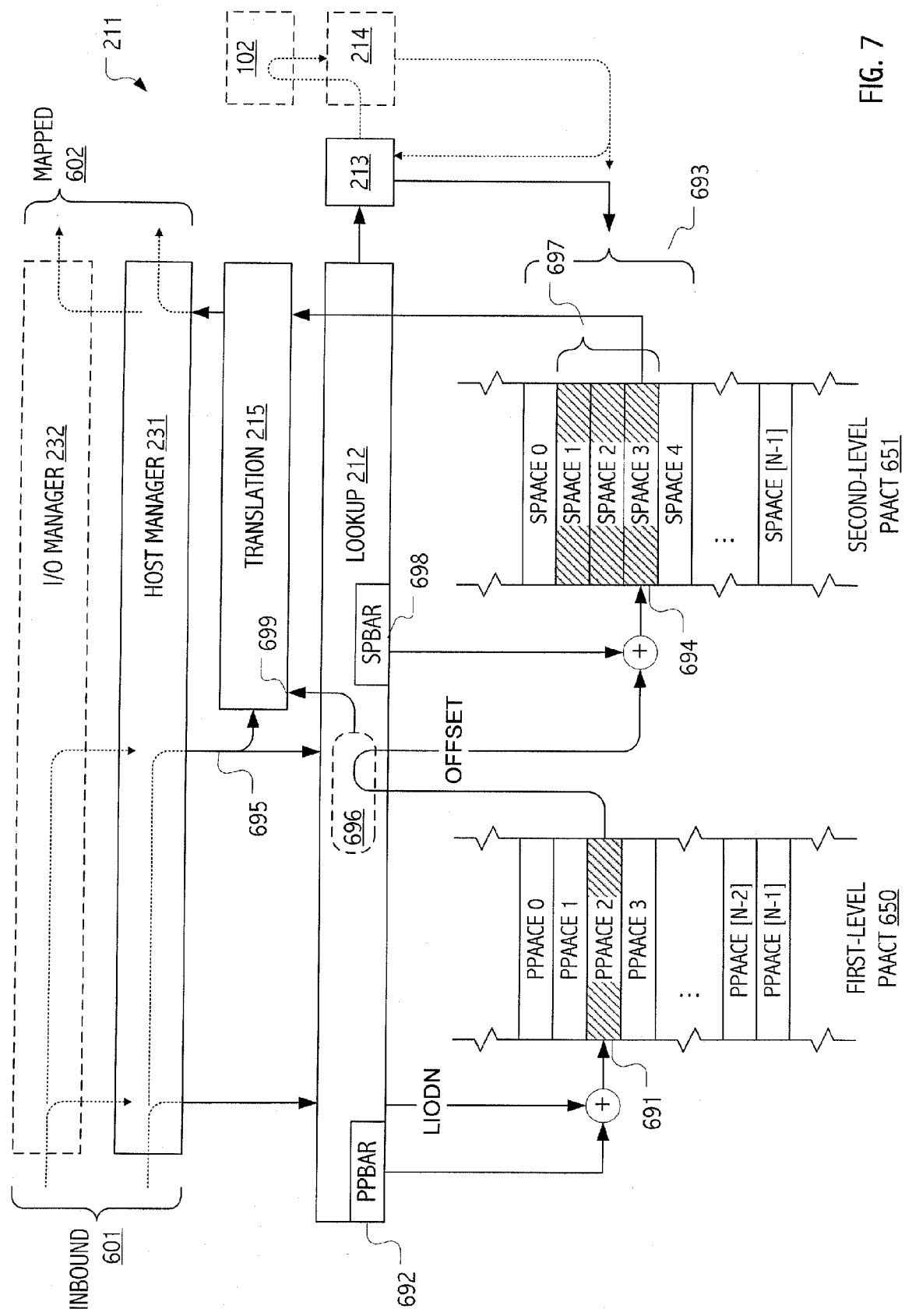
FIG. 7 depicts use of first- and second-level peripheral access authorization and control tables (PAACTs) to present for a particular logical I/O device a set of sub-windows that together define operation translations between domains in accordance with some embodiments of the present invention.
Figure 8:
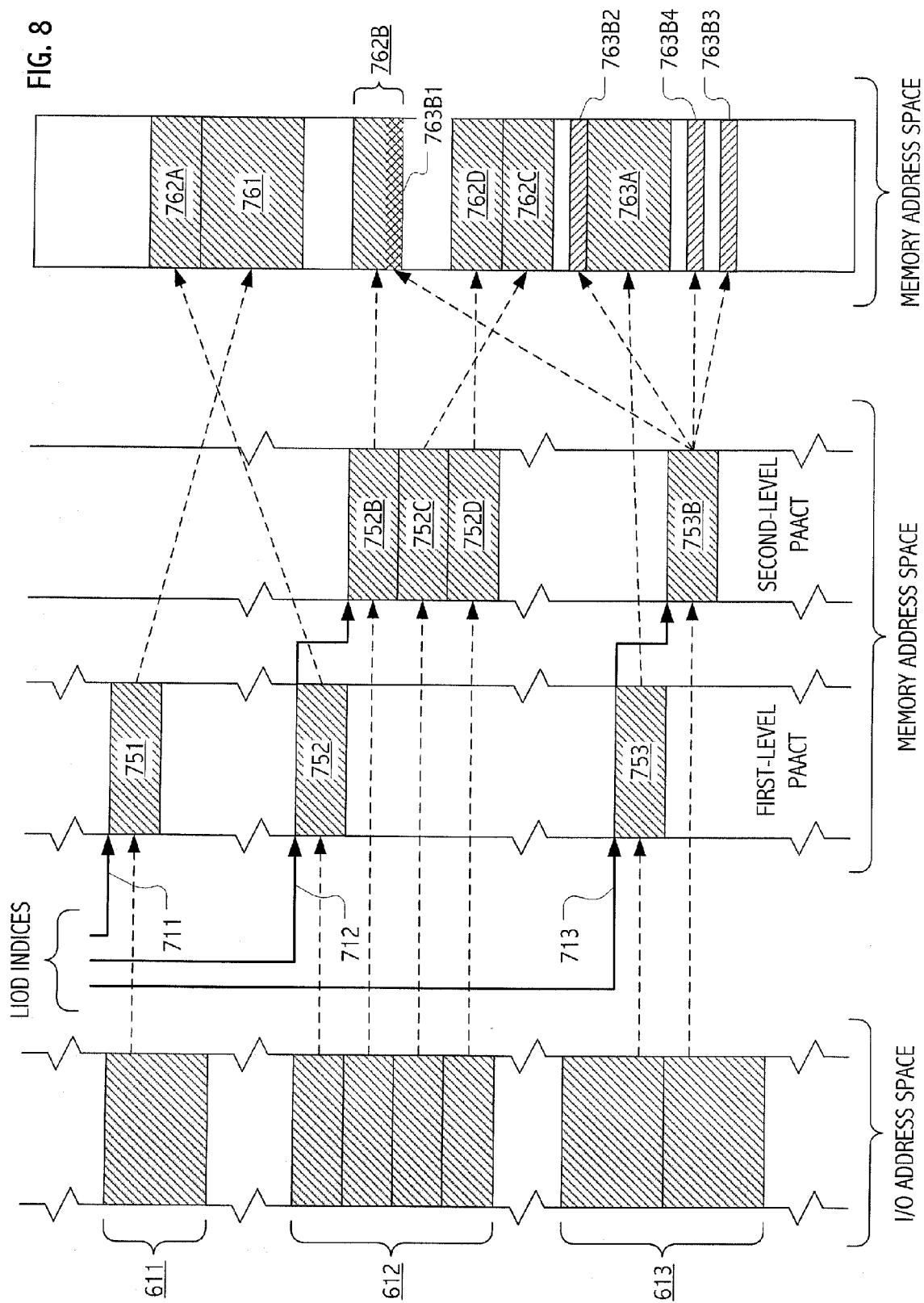
FIG. 8 illustrates mapping from an I/O address space to a memory address space via peripheral access authorization and control entries (PAACEs) represented in first- and (in some illustrated cases) second-level peripheral access authorization and control tables (PAACTs).

For purposes of illustration, FIG. 4 introduces use of primary PAACEs from a first-level PAACT. FIGS. 5 and 6 then illustrate structure of illustrative PAACE encodings suitable for use in some embodiments of the present invention. In particular, FIG. 5 illustrates fields of a PAACE encoding that may be pertinent to an inbound operation that corresponds (i) in some cases, to a primary sub-window of a DSA window that includes multiple sub-windows and (ii) in others, a DSA window that is not further decomposed into sub-windows. FIG. 6 illustrates fields of a PAACE encoding that may be pertinent to an inbound operation that corresponds to a secondary sub-window of a DSA window that includes multiple sub-windows. Thus, in some embodiments in which a hierarchy of table entries are employed, a first-level PAACT includes PAACEs in which fields are interpreted as shown in FIG. 5, while fields of PAACEs retrieved from a second-level PAACT are interpreted as shown in FIG. 6. FIG. 7 illustrates use of both primary and secondary PAACEs from respective first- and second-level PAACTs.

Turning first then to FIG. 4, we depict use of a first-level peripheral access authorization and control table (PAACT) by a peripheral access management unit (PAMU) in accordance with some embodiments of the present invention. In response to an inbound operation 301, whether originating from an I/O domain or coherence domain, lookup unit 212 is presented with information that codes or otherwise identifies (e.g., as a source or target) the logical I/O device number (LIODN) of the I/O domain-side logical device involved in the inbound operation. Using that LIODN as an offset into peripheral access authorization and control table (PAACT) 350, lookup unit 212 identifies a particular entry thereof, i.e., PAACE 391, which codes access authorization and control information together with address mapping information for at least a DSA window of address/identifier space associated with the logical I/O device involved in the operation (here, LIODN 2).

In the embodiment shown, first-level PAACT base address register 392 codes the base address (e.g., in memory 102) of PAACT 350, which in combination with the LIODN, identifies the corresponding PAACE. Other lookup mechanisms may be employed in other embodiments and, in general, lookups in cache 213 and fetches from memory 102 need not employ the same lookup mechanism. As illustrated in FIG. 3, contents of PAACT 350 may be retrieved from storage local to the PAMU, e.g., from cache 213. Alternatively, if no valid cached entry is available locally, fetch unit 214 may initiate a retrieval of at least the portion 393 of PAACT 350 that includes the identified PAACE (here, PAACE 391).

Using the information associated with inbound operation 301 (e.g., an in-bound read-type operation from an I/O domain that targets an address within an identified logical I/O device's DSA window), lookup unit 212 of PAMU 211 (recall, FIG. 2) obtains the corresponding primary PAACE from PAACT 350. Contents of the primary PAACE will indicate whether additional data structures need to be referenced to obtain the access authorization and translation attributes for inbound operation 301 given the particular logical I/O device and address(es) involved. For example, if the primary PAACE codes use of multiple sub-windows and if the targeted address is beyond the extent of the primary sub-window, a secondary PAACE associated with the corresponding secondary sub-window is accessed to obtain the access authorization and translation attributes. Alternatively, if the primary PAACE does not code use of multiple sub-windows or if the targeted address is within the primary sub-window, the primary PAACE is used to obtain access authorization and translation attributes. In some cases, such as when the operative PAACE indicates that a page address translation mode applies to inbound operation 301, additional information may be retrieved from a translation control entry coded in a translation control table (TCT). Similarly, in embodiments that support operation translation, additional information to support certain indexed translation modes may be retrieved from an operation mapping table (OMT). Like the PAACTs, TCTs and OMTs are maintained in memory (e.g., memory 102) by supervisory code and are coherently cached by PAMU 211.

Assuming, relative to the illustration of FIG. 3, that PAACE 391 does not code use of multiple sub-windows (or if it does, that the targeted address is within the primary sub-window), lookup unit 212 obtains access authorization and translation attributes pertinent to inbound operation 301 from PAACE 391 itself. Translation unit 215 performs applicable address translations in accord with a translation mode encoded in PAACE 391. In addition, IOE-to-EOE translations are also performed. In any case, a mapped operation 302 (including a target address and operation type) is supplied for forwarding to the destination domain (e.g., to memory 102 in coherency domain 124, recalling FIG. 2). To support the above-described operation of PAMU 211, encodings of peripheral access authorization and control entries support a rich and customizable set of translations for addresses and operations alike. Address and operation translation codings and corresponding translation modes for PAMU 211 are described in greater detail below with reference to FIGS. 5 and 6.

FIG. 5 depicts an illustrative coding of peripheral access authorization and control entries (PAACEs) suitable for use, in accordance with some embodiments of the present invention, as a logical I/O device specific entry in a first-level peripheral access authorization and control table PAACT. In particular, PAACE 401 illustrates an encoding of a window base address field WBA that specifies, relative to a specific logical I/O device, the base address of the corresponding DSA window in I/O interconnect space. In some embodiments, field WBA encodes (up to) the 52 most-significant bits of a 64-bit address, aligned to a 4 KB page boundary and aligned to the window size encoding field WSE. In the illustrated coding, fields WBA and WSE together define a $2^{(WSE+1)}$ Byte span for a DSA window beginning at the WBA field encoded base address. Thus, lookup unit 212 (recall FIG. 4) compares an address target of inbound operation 301 against the DSA window span, signaling a violation if appropriate. By approaching the full address-width employed in coherency domain 124, WBA field encodings allow some embodiments to specify "no-translation" address translations modes for some accesses. In any case, lesser-width WBA field encodings may be employed in some embodiments.

The multiple windows field MW (shown in PAACE 401) is used to indicate whether multiple sub-windows exist within the logical I/O device specific DSA window and, if so, the number of equally-sized sub-windows is coded in the window count encoding WCE field, where (in the illustrated embodiment) the sub-window count so encoded is $2^{(WCE+1)}$. Thus, lookup unit 212 (recall FIG. 4) further compares an address target of inbound operation 301 against the sub-window decomposition (if any) established by field WCE and places the address within a particular sub-window. If address target falls within the first such sub-window (consistent with contents of the sub-window sub-range encoding SWSE field), then pertinent access authorization and translation control codings appear in this PAACE instance (i.e., that described with reference to PAACE 401). On the other hand, if the address target falls within a subsequent sub-window, then lookup unit 212 uses the first secondary PAACE index field FSPI (coded within PAACE 401) to identify the location (within a second-level PAACT) at which secondary PAACEs are encoded for the second and subsequent sub-windows. FIG. 6 depicts an illustrative coding format 501 for secondary PAACEs.

Turning to FIG. 7, we depict use of first- and second-level peripheral access authorization and control tables (PAACTs) by a peripheral access management unit (PAMU) in accordance with some embodiments of the present invention. In response to an inbound operation 601, whether originating from an I/O domain or coherence domain, lookup unit 212 is presented with information that codes or otherwise identifies (e.g., as a source or target) the logical I/O device number (LIODN) of the I/O domain-side logical device involved in the inbound operation as well as a target address 695 in the DSA window corresponding to that LIODN. Using that LIODN as an offset into first-level PAACT 650, lookup unit 212 identifies a particular entry thereof, i.e., primary PAACE 691, which codes access authorization and control information together with address mapping information a primary sub-window of address/identifier space associated with the logical I/O device involved in the operation.

In the embodiment shown, first-level PAACT base address register 692 codes the base address of PAACT 650, which in combination with the LIODN, identifies the corresponding primary PAACE 691. Contents of primary PAACE 691 code fields that determine how PAMU 211 evaluates access authorization controls and translations for at least a portion of the logical I/O device's DSA window. Included in primary PAACE 691 are the previously described base address WBA and window size encoding WSE fields that together specify, relative to the logical I/O device, the base and span of the corresponding DSA window. In the illustrated case, the multiple windows MW and window count encoding WCE fields (also coded in primary PAACE 691) indicate that the logical I/O device specific DSA window contains four (4) equally-sized sub-windows. Accordingly, upon comparison of address target 695 of inbound operation 601 with the PAACE 691 encoded sub-window decomposition, lookup unit 212 places the address target within the fourth sub-window. Also coded in primary PAACE 691 is the previously described field FSPI which codes an index within second-level PAACT 651 at which secondary PAACEs 697 (here, SPAACE 1, SPAACE 2 and SPAACE 3) for the second, third and fourth sub-windows appear. Using the field FSPI and its placement (consistent with contents of the WCE field) of the address target within the fourth sub-window, lookup unit 212 determines (696) an effective offset (OFFSET) into second-level PAACT 651. Secondary PAACT base address register 698 codes the base address (e.g., in memory 102) of PAACT 651.

Using the base address and offset, lookup unit 212 obtains and supplies translation unit 215 with the secondary PAACE 694 that codes access authorization and translation controls pertinent to the fourth sub-window of the logical I/O device specific DSA window in which target address 695 is placed. Note that if target address 695 had instead been placed in the first sub-window, primary PAACE 691 would code the pertinent access authorization and translation controls and lookup unit 212 could have supplied translation unit 215 with contents of primary PAACE 691 without retrieval of a secondary PAACE from second-level PAACT 651. In short, primary PAACE 691 and secondary PAACEs 697 together code individually with respect to their respective sub-windows access authorization and translation control attributes that define operation of PAMU 211, and in particular, address and operation translations performed by translation unit 215. Accordingly, operation of PAMU 211 in general and translation unit 215 in particular will be understood with reference to attributes coded for a particular logical I/O device in its PAACEs.

As previously explained, FIG. 5 depicts an illustrative coding of a primary PAACE suitable for use as a logical I/O device specific entry in a first-level PAACT. FIG. 6 likewise depicts an analogous coding for secondary PAACEs suitable for use as entries in a second-level PAACT. In the illustrated codings, similar or identical codings for certain access authorization and translation controls are employed in both primary and secondary PAACEs (i.e., in PAACEs in accord with either FIG. 5 or FIG. 6). Accordingly, although field codings and related operation of PAMU 211 and translation unit 215 are described with reference FIG. 5 and to secondary PAACE lookup consistent with FIG. 7, persons of ordinary skill in the art will appreciate that much of the description is also applicable to situations (such as that illustrated in FIG. 4) in which a given access is governed by contents of a primary PAACE coded in accord with FIG. 5.

Turning then to FIG. 6, an access permissions AP field codes whether access by an inbound operation associated with the corresponding sub-window is permitted and, if permitted, the type(s) of accesses permitted. An address translation mode ATM field codes whether address translation is enabled for address targets of an inbound operation associated with the corresponding sub-window and, if so, the type of address translation to perform. An operation translation mode OTM field codes whether operation translation is enabled for an inbound operation associated with the corresponding sub-window and, if so the type of translation to perform. Note that the previously introduced sub-window sub-range encoding SWSE field codes the portion (potentially less than all) of the corresponding sub-window for which mappings (e.g., address translations, operation translations, etc.) are supported.

In general, any of a variety of permission sets and address translation modes may be coded in accord with the needs of a given computational system and, as previously described, particular sub-window specific selections are typically maintained by supervisory code (e.g., by a hypervisor or partition manager in a virtualized or partitioned computational system). Therefore, for purposes of illustration only and without limitation, some PAACE encodings in accord with formats 401, 501 allow selection (using the field AP) of sub-window specific permissions from a set that includes (i) denied, (ii) query only, (iii) update only and (iv) permitted for all operation types.

Similarly, and again only for purposes of illustration and without limitation, some PAACE encodings allow selection (using the field ATM illustrated in formats 401, 501) of sub-window specific address translation modes from a set that includes (i) no translation, (ii) window only translation, (iii) page only translation and (iv) window and page translation. For an inbound operation 601 that maps (based on lookup of the associated PAACE by lookup unit 212) as a window only address translation, translation unit 215 uses a base address coded in the translated window base address TWBA field of the associated PAACE as a base for the translated address supplied as part of mapped operation 602. Window only address translation directs translation unit 215 to map those DSA operation targets that fall within particular sub-window to a contiguous window of the same size in system storage (e.g., memory 102), wherein the contiguous window begins at an address specified by the TWBA field of the associated PAACE. In this way, the DSA window can be located anywhere in the I/O interconnect address space including an address range where the addressing width of the I/O interconnect address space is larger than that defined for system storage space. In general, depending on the particular TWBA field values established for different logical I/O devices and/or different sub-windows, the mapped-to ranges of addresses in system storage space may overlap.

With respect to an inbound operation 601 that maps as a page only address translation, lookup unit 212 uses a base address coded in the translation control table base address TCTBA field and a page size encoding PSE field of the associated PAACE to facilitate further retrieval of page-level address translation information from a translation control table (TCT). In particular, lookup unit 212 retrieves an appropriate translation control entry (TCE) using contents of fields TCTBA and PSE to identify an appropriate TCE that itself codes page-specific address translations and access-permissions corresponding to a page address portion of the target address 695 associated with inbound operation 601. Using a translated page address retrieved from the corresponding TCE together with an offset derived from the target address

695, translation unit 215 supplies the translated address for mapped operation 602. In this way, addresses within a particular sub-window can be mapped on a page-level granularity to locations within system storage space. In general, depending on the particular contents of translation control entries established for different logical I/O devices and/or different sub-windows, the mapped-to pages may be arbitrarily distributed throughout system storage space, including with overlap if desired. Note that in some embodiments including some embodiments that seek to support PCI addressing models and legacy 32-bit devices, only a portion of the I/O interconnect address space, e.g., that below a 4 GB boundary may be subject to page translations.

Additional address translation modes are supported in some embodiments. For example, in some embodiments, the field ATM may code for a particular sub-window that no address translations are to be performed and that a target address 695 is to be passed through to the mapped operation 602 without translation. Similarly, in some embodiments a combined, window and page address translation mode may be supported in which a section of a DSA window (e.g., up to a 4 GB portion thereof) covered by a given PAACE is mapped using page translations coded in a translation control table as previously described, while the remainder of the sub-window is mapped as described above with respect to the window only address translation mode. In the PAACE formats illustrated in FIGS. 5 and 6, section base address SBA and section size encoding SSE fields delimit the section for which page translations are to be performed by translation unit 215.

Operation Translations Detail

Building on the foregoing description of address translations, we now turn to fields of PAACE codings employed in operation translations. As before, FIG. 5 illustrates fields of a PAACE encoding that may be pertinent to the mapping of an inbound operation that corresponds (i) in some cases, to primary sub-window of a DSA window that includes multiple sub-windows and (ii) in others, a DSA window that is not further decomposed into sub-windows. Also as before, FIG. 6 illustrates fields of a PAACE encoding that may be pertinent to the mapping of an inbound operation that corresponds to a secondary sub-window of a DSA window that includes multiple sub-windows. Thus, in some embodiments or situations in which a hierarchy of table entries are employed, a first-level PAACT includes PAACEs in which fields are interpreted as shown in FIG. 5, while fields of PAACEs retrieved from a second-level PAACT are interpreted as shown in FIG. 6.

In the illustrated embodiments, fields pertinent to operation translations are coded uniformly, irrespective of the PAACT level in which they appear. Accordingly, the description that follows does not distinguish between entries appearing in first- and second-level PAACTs and the operation translation techniques illustrated may, in general, be employed in embodiments or situations that employ single or multiple levels of PAACEs.

In view of the above, an operation translation mode OTM field (see FIGS. 5, 6) codes whether operation translation is enabled for an inbound operation associated with the corresponding addressing window (or sub-window), and if so, the type of operation translation to perform. For purposes of illustration and without limitation, some PAACE encodings allow selection (using the field OTM) of specific operation translation modes selected from a set that includes (i) no operation translation, (ii) immediate IOE-to-EOE translation and (iii) indexed IOE-to-EOE translation.

If source and destination protocols for a DSA operation are the same, or if equivalent ingress (IOE) and egress (EOE) codings are used to express operation types across the boundary mapped by a PAMU implementation, then no operation translation may be required. Accordingly, for an inbound operation for which a no translation OTM field value is specified, a cross-boundary operation mapping (e.g., from I/O Domain 121 to coherency domain 124 in the illustration of FIG. 3) is determined entirely (if at all) by I/O operation code to IOE mappings and EOE to coherence operation mappings defined at respective interfaces (e.g., at host manager 231 and I/O manager 232). In contrast, immediate and indexed OTM field values indicate that IOE-to-EOE translations are performed by PAMU 211 in addition to domain-to-abstract (ingress or egress) mappings (if any) performed at the interfaces.

For an inbound operation for which an immediate OTM field value is specified, mappings from ingress codings to egress codings are specified by the PAACE itself. For example, in embodiments such as illustrated in FIGS. 5 and 6, two corresponding IOE and EOE pairs are specified in ingress operation encoding (IOEA and IOEB) fields and mapped operation encoding (MOEA and MOEB) fields. Referring then to the illustration of FIG. 3, in the case of an immediate OTM field value in the operative table entry (e.g., PAACE 317), operation translation facility 315A of PAMU 211 maps an IOE value that matches contents of field IOEA to the EOE value in field MOEA and maps an IOE value that matches contents of field IOEB to the EOE value in field MOEB. In some embodiments, a portion of each mapped operation encoding field is used to code validity of the corresponding mapping and IOE values that do not match an ingress operation encoding field (IOEA or IOEB) with a valid mapped operation encoding (MOEA or MOEB) are unsupported, although other design choices may be implemented in other embodiments.

For an inbound operation for which an indexed OTM field value is specified, mappings from ingress codings to egress codings are specified in entries of an in-memory operation mapping table (OMT). Indexed operation translations facilitate coding of significantly larger numbers of IOE-to-EOE mappings. Contents of the operation mapping index (OMI) field specify (in conjunction with a base address) a memory address at which a pertinent set mapped operation entries (MOEs) begin. In some embodiments, 7 bits of an IOE are used to calculate an offset from that memory address, allowing up to 128 distinct IOE-to-EOE mappings to be encoded. Referring then to the illustration of FIG. 3, in the case of an indexed OTM field value in the operative table entry (e.g., PAACE 317), operation translation facility 315A of PAMU 211 maps an IOE value to contents of the MOE so indexed. As before, In some embodiments, a portion of MOE is used to code validity of the corresponding mapping, although other design choices may be implemented in other embodiments.

Specialized and Storage Efficient Mappings

Given the foregoing, it will be apparent to persons of ordinary skill in the art that computational systems that employ peripheral access management techniques such as described herein with reference to PAMU 211 (recall FIG. 2) and memory resident first- and second level PAACTs that code address translations with respect to individual logical I/O devices and sub-windows of I/O address space (recall FIGS. 3-6) provide a flexible mechanism for specializing mappings to the individual needs of many disparate devices, virtualization schemes and/or use patterns. Mappings between I/O and host domains can be established by supervisory code in ways that allow fine-grained flexibility in the form, granularity and/or extent of mappings, attributes and access controls coded relative to a particular I/O domain. Indeed, different address translation models may be employed on a per-logicaldevice (or even a per-sub-window) basis. In general, this flexibility can be desirable, particularly as numbers of I/O domains increase, such as in the case of virtualization system implementations in which a multiplicity of logical I/O devices may be represented using underlying physical resources.

Rather than attempting to create a unified set of access, authorization and/or control information for mappings between all I/O and host domains (or even a unified mapping for subsets of the I/O domains corresponding to logical I/O devices supported using common underlying resources), each logical I/O device may be supported with information that need only encode that pertinent thereto and then, only in a manner that is useful or efficient for the particular logical I/O device and its relevant mappings. Accordingly, as illustrated in FIG. 7, portions of I/O address space corresponding to three different logical I/O devices (shown as DSA windows 611, 612 and 613, respectively) may be mapped using differing granularities and extents which are appropriate to their individual needs.

Logical I/O device numbers (LIODNs) are used as indices 711, 712 and 713 into a primary peripheral access authorization control table (PAACT) that includes peripheral access authorization control entries (PAACEs) 751, 752 and 753 that include (for respective logical I/O devices) the WBA and WSE field encoded bases and extents (recall FIG. 4) that correspond to DSA windows 611, 612 and 613, respectively. In addition, PAACEs 751, 752 and 753 include (for respective logical I/O devices) the MW and WCE field encoded multiple sub-window flag and sub-window counts that correspond to DSA windows 611, 612 and 613, respectively. In particular, in the illustration of FIG. 7, DSA window 611 is generally smaller than DSA windows 612 and 613 and includes only a primary (sub-)window, whereas DSA windows 612 and 613 include four (4) and two (2) sub-windows respectively. Thus, in a PAMU configuration using PAACT and PAACE coded access authorization and translation controls such as illustrated, individual logical I/O devices are supported with differing granularities and extents.

Using only the single-level primary PAACE 751 encoding, a computational system codes a window only address mapping to a corresponding contiguous window 761 in memory address space. Using a primary PAACE 752 together with secondary PAACEs 752B, 752C and 752D, the computational system codes dissimilar window only address mappings to a generally discontiguous set of corresponding sub-windows 762A, 762B, 762C and 762D in memory address space. Finally, using a primary PAACE 753 together with a secondary PAACE 753B (and a translation control table encoding not separately shown), the computational system codes a window only address mapping for the first sub-window of DSA window 613 to sub-windows 762A in system address space, together with a page-oriented set of mapping for the second sub-window of DSA window 613 to pages 763B1, 763B2, 763B3 and 763B4 in system address space.

In some systems that incorporate embodiments of the present invention, the ability to encode access, authorization and/or control information on a per-logical device basis (or even a per-sub-window basis within a given I/O domain) facilitates coding of the mappings in ways that are, in aggregate, quite storage-efficient as the coding for one I/O domain need not be fettered by complexity necessary or desirable only for another and since no grand unification of mappings is necessary. In short, by defining mapping data structure(s) in a way that allows differing complexity, granularity and/or extent of mapping for individual logical I/O domains, system implementations need not code all mappings in accord with requirements of the most complex or storage intense. In this way, scaling of overall storage requirements may be managed in access management system implementations. In addition, in some embodiments, the form of mappings (e.g., address) may be specialized on a per-logical-device basis (or per-sub-window basis), thereby offering individual logical I/O domains (or sub-windows thereof) paged, windowed, mixed, and/or un-translated mapping frameworks appropriate to their individual requirements or needs.

EXAMPLES

In some embodiments, a method of mapping transactions from device-specific input/output (I/O) domains to a host domain includes instantiating in storage accessible to an I/O memory management unit (IOMMU) a mapping data structure that separately codes for each of the device-specific I/O domains, mapping information including operation translations to be applied to transactions associated with an address translation window for a respective one of the device-specific I/O domains; specifying for at least a portion of an address translation window for a first one of the device-specific I/O domains, a first operation translation; and specifying for at least a portion of an address translation window for a second one of the device-specific I/O domains, a second operation translation, the second operation translation differing from the first.

In some embodiments, such a method is performed by a hypervisor in correspondence with a partitioning of physical I/O resources into logical I/O devices corresponding to the device-specific input/output (I/O) domains.

In some embodiments, based on contents of the mapping data structure, the IOMMU applies the operation translations to individual transactions based on operation translation modes coded for a particular device-specific I/O domain to which a particular transaction corresponds. In some embodiments, such a method further provides that the corresponding operation translation modes are selected from a set of at least two operation translation modes that includes an immediate operation translation mode, the immediate operation translation mode directing the IOMMU to translate based on an applicable ingress-to-egress mapping of operations coded in an entry of the mapping data structure for the particular device-specific I/O domain to which a particular transaction corresponds. In some embodiments, such a method further provides that the corresponding operation translation modes are selected from a set of at least two operation translation modes that includes an indexed operation translation mode, the indexed operation translation mode directing the IOMMU to index into an operation mapping entry for the particular device-specific I/O domain to which a particular transaction corresponds, wherein the index is based on an ingress operation encoding and the indexed to position in the operation mapping entry codes an egress operation.

In some embodiments, such a method further includes separately coding in the mapping data structure, mapping information for a first subwindow of the second device-specific I/O domain and for one or more additional subwindows thereof; and further specifying for a particular subwindow of the second device-specific I/O domain, a third operation translation, the third operation translation differing from the second. In some embodiments, such a method further includes the IOMMU applying the operation translations to individual transactions based on an operation translation mode coded for the particular address translation window or subwindow to which a particular transaction corresponds. In some embodiments, such a method the operation translation mode for any particular translation window or subwindow to which a particular transaction corresponds is selected from a set that includes a no translation mode, an immediate operation translation mode that directs the IOMMU to translate based on an applicable ingress-to-egress mapping of operations coded in an address translation window- or subwindow-specific entry of the mapping data structure to which a particular transaction corresponds, and an indexed operation translation mode that directs the IOMMU to index into an operation mapping entry for the particular device-specific I/O domain to which a particular transaction corresponds, wherein the index is based on an ingress operation encoding and the indexed to position in the operation mapping entry codes an egress operation. In some embodiments, such a method further includes specifying, separately for each of the address translation window or subwindow, an address translation mode.

In some embodiments, the method further includes specifying, separately for the first and second device-specific I/O domains, an address translation mode. In some embodiments, the method further includes, for each of the device-specific I/O domains, coding in an associated first-level table entry of the mapping data structure whether and, if so, how many, address translation subwindows are coded for the associated device-specific I/O domain; for the first device-specific I/O domain, coding in the associated first-level table entry, both address and operation translation modes for an entire address window thereof; and for the second device-specific I/O domain, coding address and operation translation modes for a first subwindow thereof in the associated first-level table entry and coding address and operation translation modes for remaining ones of the subwindows in respective second-level table entries identifiable via the associated first-level table entry.

In some embodiments, such a method further includes coding egress operations in a third-level table entry identifiable via an associated first-level or second-level table entry, wherein appropriate egress operations are indexed by the IOMMU in connection with an address and operation translation for the corresponding window or subwindow of the corresponding device-specific I/O domain.

In some embodiments, a method of mapping transactions from plural device-specific input/output (I/O) domains to a host domain includes applying operation translations to transactions based on operation translation modes coded for the specific one of the device-specific I/O domains to which a particular transaction corresponds, wherein, for first and second transactions that respectively correspond to first and second ones of the device-specific I/O domains, the applied operation translations are based on different ones of the operation translation modes.

In some embodiments, such a method provides that, for the second transaction and a third transaction that respectively correspond to first and second address translation subwindows of the second device-specific I/O domain, the applied operation translations are based on different ones of the operation translation modes. In some embodiments, the different operation translation modes are selected from a set of operation translation modes, which includes two or more of a no operation translation mode; an operation translation via immediate fields mode; an operation translation via index into mapping table mode; and an operation translation via immediate index fields mode. In some embodiments, such a method further includes applying address translations and access controls to transactions based on the specific one of the device-specific I/O domains to which a particular transaction corresponds. In some embodiments, such a method further provides that the operation translations applied, as well as address translations and access controls, are based on the specific one of the device-specific I/O domains or addressing subwindow thereof to which a particular transaction corresponds. In some embodiments, the method is performed by an I/O memory management unit (IOMMU) that is coupled between the device-specific input/output (I/O) domains and the host domain, wherein the operation translation modes, together with address translations and access controls, are established by a hypervisor in correspondence with a partitioning of physical I/O resources into logical I/O devices that correspond to the device-specific input/output (I/O) domains.

In some embodiments, an apparatus includes a peripheral access management unit for coupling between storage and I/O resources to map transactions from a plurality of logical device-specific I/O domains to respective locations in a coherent memory domain. The peripheral access management unit is configured to manage I/O accesses based on contents of a mapping data structure that specifies individually for the logical device-specific I/O domains, respective operation translation modes such that, for particular first and second transactions that respectively correspond to differing logical device-specific I/O domains, operation translations applied by the peripheral access management unit are based on different ones of the operation translation modes.

In some embodiments, such an apparatus further includes storage for the mapping data structure, the storage accessible to the peripheral access management unit, wherein the mapping data structure further specifies individually for addressing subwindows of at least a particular one of the logical device-specific I/O domains, respective operation translation modes. The peripheral access management unit is configured to manage I/O accesses based on contents of a mapping data structure such that, for particular third and fourth transactions that respectively correspond to differing subwindows of the particular logical device-specific I/O domain, operation translations applied by the peripheral access management unit are based on different ones of the operation translation modes.

Other Embodiments

Although the invention is described herein with reference to specific embodiments, various modifications and changes can be made without departing from the scope of the present invention as set forth in the claims below. For example, while techniques have been described in the context of particular peripheral access management unit configurations, the described techniques have broad applicability to mappings between identifier domains. Although the described techniques may be employed to facilitate efficient use address spaces and efficient codings of access authorization and translation controls, the techniques are not limited thereto. Similarly, while particular sets of operations and semantic variants have been described with reference to illustrative I/O and coherency domain operations, persons of ordinary skill in the art will recognize that the particular sets of operations and variants are not critical. Rather, they are used solely to illustrate potential operation translations that may be performed in accord with some embodiments of the present invention.

Embodiments of the present invention may be implemented using any of a variety of different information processing systems. Accordingly, while FIG. 1 together with its accompanying description relates to an exemplary partitionable multiprocessor-type information processing architecture with a coherent multi-path interconnect fabric, the exemplary architecture is merely illustrative. While illustrations have tended to focus on a peripheral access management unit (PAMU)-type implementation by which a multiplicity of logical I/O devices and domains may be supported using underlying physical resources, such implementations may include support for a range of variations in form, granularity and/or extent of mappings as well as support for access and authorization controls that need not be included in all embodiments. Instead, based on the description herein persons of ordinary skill in the art will appreciate applications of the invented techniques to other access management systems (including those styled as MMUs, PAMUs, IOMMUs, etc.) and computational systems with or without virtualization, multiprocessor support or partitionable aspects. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, systems and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

In general, the terms "program" and/or "code" are used herein to describe a sequence or set of instructions designed for execution on a computer system. As such, such terms may include or encompass subroutines, functions, procedures, object methods, implementations of software methods, interfaces or objects, executable applications, applets, servlets, source, object or intermediate code, shared and/or dynamically loaded/linked libraries and/or other sequences or groups of instructions designed for execution on a computer system.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method comprising:
instantiating in non-transient storage accessible to an I/O memory management unit (IOMMU) a mapping data structure that separately codes for each of plural device-specific I/O domains, mapping information for mapping transactions from the device-specific input/output (I/O) domains to a host domain, the mapping information including (i) address translations and, for at least some of the device-specific I/O domains, (ii) operation translations to be applied to transactions associated with an address translation window for a respective one of the device-specific I/O domains;
specifying for at least a portion of an address translation window for a first one of the device-specific I/O domains, a first operation translation; and specifying for at least a portion of an address translation window for a second one of the device-specific I/O domains, a second operation translation, the second operation translation differing from the first;
wherein the method is performed by a hypervisor in correspondence with a partitioning of physical I/O resources into logical I/O devices corresponding to the device-specific input/output (I/O) domains.

2. A method of mapping transactions from device-specific input/output (I/O) domains to a host domain, the method comprising:
instantiating in storage accessible to an I/O memory management unit (IOMMU) a mapping data structure that separately codes for each of the device-specific I/O domains, mapping information including operation translations to be applied to transactions associated with an address translation window for a respective one of the device-specific I/O domains;
specifying for at least a portion of an address translation window for a first one of the device-specific I/O domains, a first operation translation;
specifying for at least a portion of an address translation window for a second one of the device-specific I/O domains, a second operation translation, the second operation translation differing from the first; and
based on contents of the mapping data structure, the IOMMU applying the operation translations to individual transactions based on operation translation modes coded for a particular device-specific I/O domain to which a particular transaction corresponds.

3. The method of claim 2, wherein the corresponding operation translation modes are selected from a set of at least two operation translation modes that includes an immediate operation translation mode, the immediate operation translation mode directing the IOMMU to translate based on an applicable ingress-to-egress mapping of operations coded in an entry of the mapping data structure for the particular device-specific I/O domain to which a particular transaction corresponds.

4. The method of claim 2, wherein the corresponding operation translation modes are selected from a set of at least two operation translation modes that includes an indexed operation translation mode, the indexed operation translation mode directing the IOMMU to index into an operation mapping entry for the particular device-specific I/O domain to which a particular transaction corresponds, wherein the index is based on an ingress operation encoding and the indexed to position in the operation mapping entry codes an egress operation.

5. The method of claim 1, further comprising:
separately coding in the mapping data structure, mapping information for a first subwindow of the second device-specific I/O domain and for one or more additional subwindows thereof; and
further specifying for a particular subwindow of the second device-specific I/O domain, a third operation translation, the third operation translation differing from the second.

6. A method of mapping transactions from device-specific input/output (I/O) domains to a host domain, the method comprising:
instantiating in storage accessible to an I/O memory management unit (IOMMU) a mapping data structure that separately codes for each of the device-specific I/O domains, mapping information including operation translations to be applied to transactions associated with an address translation window for a respective one of the device-specific I/O domains;

specifying for at least a portion of an address translation window for a first one of the device-specific I/O domains, a first operation translation;

specifying for at least a portion of an address translation window for a second one of the device-specific I/O domains, a second operation translation, the second operation translation differing from the first;

separately coding in the mapping data structure, mapping information for a first subwindow of the second device-specific I/O domain and for one or more additional subwindows thereof;

further specifying for a particular subwindow of the second device-specific I/O domain, a third operation translation, the third operation translation differing from the second; and the IOMMU applying the operation translations to individual transactions based on an operation translation mode coded for the particular address translation window or subwindow to which a particular transaction corresponds.

7. The method of claim 6, wherein the operation translation mode for any particular translation window or subwindow to which a particular transaction corresponds is selected from a set that includes:

a no translation mode;

an immediate operation translation mode that directs the IOMMU to translate based on an applicable ingress-to-egress mapping of operations coded in an address translation window- or subwindow-specific entry of the mapping data structure to which a particular transaction corresponds; and an indexed operation translation mode that directs the IOMMU to index into an operation mapping entry for the particular device-specific I/O domain to which a particular transaction corresponds, wherein the index is based on an ingress operation encoding and the indexed to position in the operation mapping entry codes an egress operation.

8. The method of claim 7, further comprising:
specifying, separately for each of the address translation window or subwindow, an address translation mode.

9. The method of claim 1, further comprising:
specifying, separately for the first and second device-specific I/O domains, an address translation mode.

10. The method of claim 1, further comprising:
for each of the device-specific I/O domains, coding in an associated first-level table entry of the mapping data structure whether and, if so, how many, address translation subwindows are coded for the associated device-specific I/O domain;

for the first device-specific I/O domain, coding in the associated first-level table entry, both address and operation translation modes for an entire address window thereof; and for the second device-specific I/O domain, coding address and operation translation modes for a first subwindow thereof in the associated first-level table entry and coding address and operation translation modes for remaining ones of the subwindows in respective second-level table entries identifiable via the associated first-level table entry.

11. The method of claim 10, further comprising:
coding egress operations in a third-level table entry identifiable via an associated first-level or second-level table entry, wherein appropriate egress operations are indexed by the IOMMU in connection with an address and operation translation for the corresponding window or subwindow of the corresponding device-specific I/O domain.

12. A method of mapping transactions from plural device-specific input/output (I/O) domains to a host domain, the method comprising:

applying operation translations to transactions based on operation translation modes coded for the specific one of the device-specific I/O domains to which a particular transaction corresponds, wherein, for first and second transactions that respectively correspond to first and second ones of the device-specific I/O domains, the applied operation translations are based on different ones of the operation translation modes, and wherein the method is performed by an I/O memory management unit (IOMMU) that is coupled between the device-specific input/output (I/O) domains and the host domain, wherein the operation translation modes, together with address translations and access controls, are established by a hypervisor in correspondence with a partitioning of physical I/O resources into logical I/O devices that correspond to the device-specific input/output (I/O) domains.

13. The method of claim 12, wherein, for the second transaction and a third transaction that respectively correspond to first and second address translation subwindows of the second device-specific I/O domain, the applied operation translations are based on different ones of the operation translation modes.

14. The method of claim 12, wherein the different operation translation modes are selected from a set of operation translation modes, which includes two or more of: a no operation translation mode; an operation translation via immediate fields mode;

an operation translation via index into mapping table mode;

and an operation translation via immediate index fields mode.

15. The method of claim 12, further comprising:
applying address translations and access controls to transactions based on the specific one of the device-specific I/O domains to which a particular transaction corresponds.

16. The method of claim 12, wherein the operation translations applied, as well as address translations and access controls, are based on the specific one of the device-specific I/O domains or addressing subwindow thereof to which a particular transaction corresponds.

17. An apparatus comprising:
a peripheral access management unit for coupling between storage and I/O resources to map transactions from a plurality of logical device-specific I/O domains to respective locations in a coherent memory domain, the peripheral access management unit configured to manage I/O accesses based on contents of a mapping data structure that specifies individually for the logical device-specific I/O domains, respective operation translation modes such that, for particular first and second transactions that respectively correspond to differing logical device-specific I/O domains, operation translations applied by the peripheral access management unit are based on different ones of the operation translation modes.

18. The apparatus of claim 17, further comprising:
storage for the mapping data structure, the storage accessible to the peripheral access management unit, wherein the mapping data structure further specifies individually for addressing subwindows of at least a particular one of the logical device-specific I/O domains, respective operation translation modes, the peripheral access management unit configured to manage I/O accesses based on contents of a mapping data structure such that, for particular third and fourth transactions that respectively correspond to differing subwindows of the particular logical device-specific I/O domain, operation translations applied by the peripheral access management unit are based on different ones of the operation translation modes.

* * * * *